Oct. 11, 1955  E. K. PROCTOR  2,720,589
RAPID SCANNING RADAR ANTENNA
Filed July 27, 1951  3 Sheets-Sheet 1

INVENTOR
EDWARD K. PROCTOR
BY
Paul B. Hunter
ATTORNEY

Oct. 11, 1955   E. K. PROCTOR   2,720,589
RAPID SCANNING RADAR ANTENNA
Filed July 27, 1951   3 Sheets-Sheet 2

INVENTOR
EDWARD K. PROCTOR
BY
Paul B. Hunter
ATTORNEY

Oct. 11, 1955  E. K. PROCTOR  2,720,589
RAPID SCANNING RADAR ANTENNA
Filed July 27, 1951  3 Sheets-Sheet 3

INVENTOR
EDWARD K. PROCTOR
BY
Paul B. Hunter.
ATTORNEY

United States Patent Office 2,720,589
Patented Oct. 11, 1955

2,720,589

RAPID SCANNING RADAR ANTENNA

Edward K. Proctor, New York, N. Y., assignor to Sperry Rand Corporation, a corporation of Delaware Application July 27, 1951, Serial No. 238,801

8 Claims. (Cl. 250—33.63)

This invention relates generally to scanning antenna systems and the invention has reference, more particularly, to a rapid scanning radar antenna employing rotatable wave guide feeds and metal lenses for producing as much as hemispherical coverage at a rapid scanning rate.

Directive antenna scanners have been developed heretofore for use in connection with various types of radar equipment for the purpose of locating and determining the position of targets or objects and the distances thereto. Generally, such directive antenna systems have been of the mechanical type, wherein motor driven units are employed for actuating a parabolic or other reflector at a regular angular rate of speed to effect scanning of the antenna and/or the electromagnetic feed supplying the scanner is actuated mechanically. These prior art devices have been objectionable in that considerable vibration often results in the use of such devices, due to the rapid reversal of direction of motion of the same in use.

It is one purpose of the present invention to provide a novel rapid scanning antenna system, wherein a search scan is obtained over a full hemisphere, if desired. This search scan is obtained at a high rate without reversals or excessively fast mechanical motion or accelerations taking place, owing to the novel construction of the rapid scanning antenna of this invention.

One object of the present invention is to provide a novel rapid scanning radar antenna of light weight and having rotating components of small mass, whereby a high scan rate is obtained without excessively fast mechanical motions, the said antenna having great mechanical simplicity and high power handling capabilities, the said antenna also providing a constant load on the transmitter even during retrace periods.

Another object of the present invention is to provide a novel rapid scanning antenna, wherein a plurality of feed horns are moved in a circular path near the focal plane of a microwave lens, the said horns serving to distribute the energy over the lens aperture in a substantially constant manner during scanning, the horns having a continuous rotary motion, thereby reducing vibration to a minimum and enabling high rates of scan.

Another object of the present invention is to provide a rapid scanning microwave antenna system, wherein a beam of high frequency energy varying rapidly in direction is employed for scanning purposes, said beam being impinged upon the circular entrance contour of a metal lens, the exit contour of which is of a predetermined concave or other prescribed shape, whereby the maximum intensity of the radiation from the lens may be directed toward a fixed point, a lens or reflector ordinarily being located at such point to complete the desired scanning action.

Other objects and advantages will become apparent from the specification, when taken in connection with the drawings of which:

Figure 1:
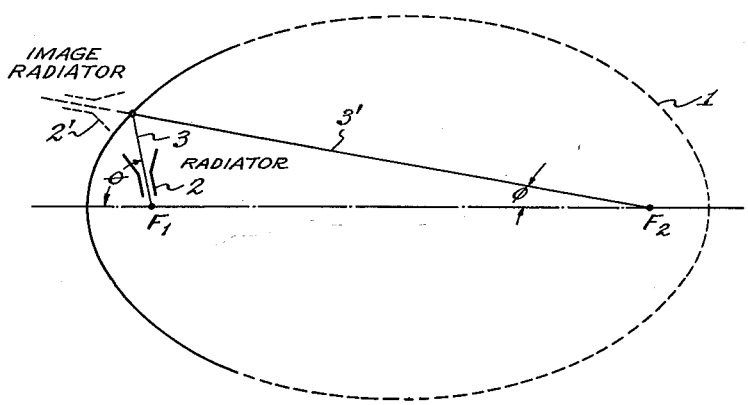
Fig. 1 is a schematic view serving to aid in the understanding of this invention.

Referring now to Fig. 1 of the drawings, the reference numeral 1 represents an ellipse having foci $F_1$ and $F_2$. According to the laws of geometric optics, if electromagnetic rays are emitted from $F_1$ and directed towards curve 1 having the form of a reflector, such rays will be reflected so as to pass through focus $F_2$. Thus, suppose a directive radiating horn 2 is spaced between the reflector 1 and focus $F_2$ in such manner that the direction of maximum radiation lies along the ray path 3 between $F_1$ and the reflector, then the direction of maximum intensity of the reflected radiation pattern will follow the path 3' and will pass through the focus $F_2$ regardless of the angular position of the horn 2 with respect to the focus $F_1$.

Since horn 2 is close to reflector 1, only a small portion of this reflector will be active at any instant in reflecting the radiation. This small portion of reflector 1 will approximate a plane reflector, whereby, except for a change of direction, the reflected radiation pattern will be nearly indentical with the radiation pattern from horn 2 in the absence of the reflector. Thus, horn 2 may be considered as having been replaced by an equivalent image radiator 2' shown in dotted lines. If radiator 2 is rotated about $F_1$ as a center, there will be a corresponding movement of the image radiator along an approximate arc. If a lens or reflector having a focal line near the locus of the image reflector is placed with its center at $F_2$, it will, in effect, be illuminated by a moving directive point source. The direction of the resultant radiated beam will vary with angle $\phi$ and hence with angle $\theta$ while the distribution of energy over the aperture of the lens or reflector will be essentially constant.

Figure 2:
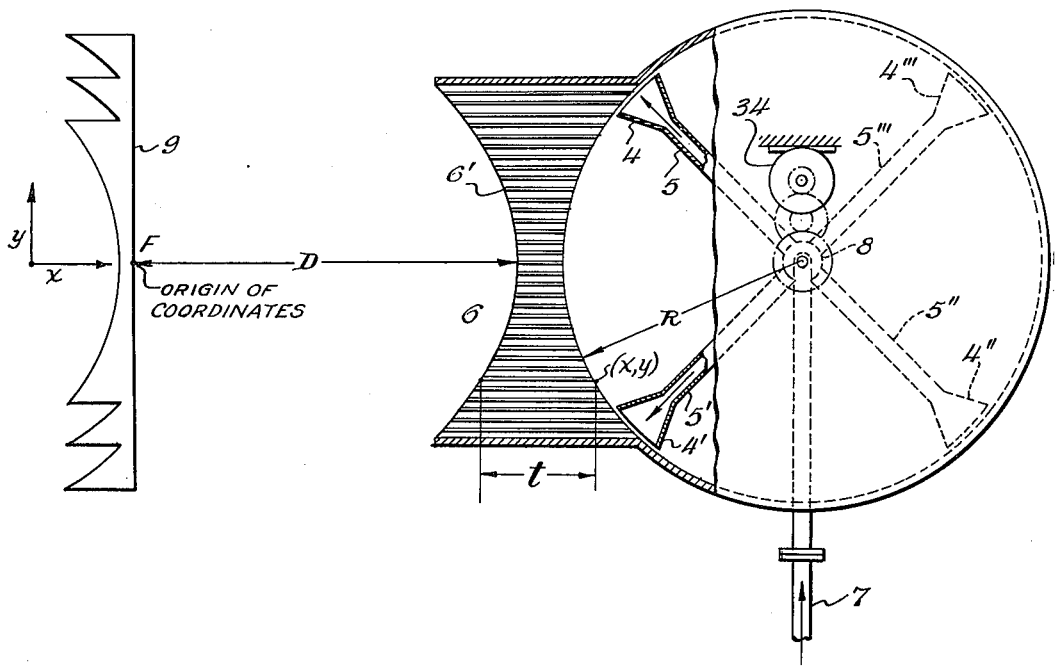
Fig. 2 is an elevational cross-sectional view of one form of the invention.

In the form of the invention shown in Fig. 2, radiators in the form of electromagnetic horns 4, 4', 4'', 4''' carried respectively by radial wave guides 5, 5', 5'', and 5''' move along circular arcs adjacent the entrance boundary of a metal plate lens 6. The radial wave guides 5, 5', 5'', and 5''' are shown supplied from a feed wave guide 7 that connects with a hollow hub 8 from which the guides 5, 5', 5'', and 5''' radiate. Motive means 34 is provided for rotating the hub 8 and hence causing the horns 4, 4', 4'', and 4''' to sweep past the entrance boundary of the lens 6. It will be noted that several spaces of the lens 6 are simultaneously energized by each horn successively and that the electromagnetic energy is constrained to flow parallel to the plates and between the same.

The wave energy emerging from the lens will have approximately the same aperture that is covered by the exciting horn. Hence, the wave energy emerging from the lens 6 will have essentially the same radiation pattern as that of the horn in the absence of the lens, except that for a given horn position, all rays will be refracted at the boundary of the metal lens by approximately the same angle, so that the direction of the horn radiation pattern will be altered without appreciably changing the other characteristics of the pattern.

The angle by which the rays will be refracted by lens 6 will vary with the angular position of the horn and is dependent upon the contour 6' of the exit surface. In particular, it is possible to select said contour in such a manner that the direction of maximum intensity of radiation from lens 6 will pass through the center F of the final focusing device 9, shown as a stepped metal lens, for all angular positions of the hub 8. This is highly desirable as it makes it possible to maintain essentially constant the distribution of energy over the surface of focusing device 9 during scanning. The particular contour of surface 6' is given by the equation $$(1) \quad t = \frac{x - nD - \sqrt{(D - nx)^2 - y^2(1 - n^2)}}{1 - n^2}$$

wherein $n$ is the index of refraction of the wave guide lens 6 and the other quantities are as shown in Fig. 2. $x$ and $y$ are the coordinates of the circular contour and $t$ is the required thickness of the lens measured in a direction parallel to the $x$-coordinate. Where the wave guide elements of the lens 6 are not loaded and have uniform H-plane dimensions, the exit contour 6' is appreciably elliptical in shape.

If a suitable focusing device, such as a lens or reflector, shown for convenience as a stepped metal lens, is located with center at F, as shown in Fig. 2, such lens will in fact be illuminated by a horn moving along the lens 6, i. e., an action will take place similar to that shown in Fig. 1, wherein point $F_2$ corresponds to point F of Fig. 2. The direction of the radiated beam from lens 9 or reflector, as the case may be, will thus vary in accordance with the angular position of the rotating horn. In the form of the invention shown in Fig. 2, the several horns 4, 4', 4" and 4''' are adapted to be energized in succession through use of the hub 8, and a rotating joint connects wave guide 7 with hub 8. The hub 8 may be provided with apertures aligned with the wave guides 5, 5', 5", and 5''', and the joint provided with an opening for alignment with these apertures in succession, thereby energizing each horn as it sweeps over the entrance contour of the lens 6. Since the number of scans per second is the product of the number of horns used by the number of revolutions of the hub 8 per second, it will be readily understood that a rapid rate of scan can be obtained with this apparatus without objectionably high rotational velocities or accelerations.

This method of scanning is readily adapted to E-plane scanning, because the plate spacing of the lens 6 can be made as small as is required to achieve a small variation in the impedance presented by the lens to the horn. This scanner has the advantages that extremely rapid rates of scan can be obtained. In conjunction with a properly designed focusing device 9, the beam can be scanned through wide angles without appreciable loss of gain or deterioration of beam quality and scanning is obtained by continuous rotation of relatively simple components.

The structure thus described enables the energy from the feed horns to be emitted along the focal plane of the collimating lens 9, and the distribution of energy over the aperture of the lens 9 is substantially constant during scanning. The rapid scanning is made possible by the continuous rotation of the horns about an axis perpendicular to the plane of scan thereby eliminating large inertia effects, which would otherwise result were the horns reciprocated instead of rotated. The double concave lens 6 diverts the plane radiation pattern from its initial path radial to its axis of rotation, to a path directed towards the center of the collimating device 9.

In practice, since the contour 6' of lens 6 is determined by the various physical constants of the apparatus and not by the optimum focal plane of focusing device 9, contour 6' and the optimum focal plane of focusing device 9 may, under some conditions, not coincide as accurately as may be desired. It is desirable, therefore, to be able to specify that contour 6' shall coincide with a predetermined optimum focal plane of focusing device 9 without compromising the performance of lens 6. This can readily be achieved if in Equation 1 the index of refraction $n$ be allowed to assume suitable values for different values of the coordinate $y$. This might be done, for example, by causing the H-plane dimensions of the wave guide elements comprising the lens 6 to have different values for different values of $y$.

From another point of view, lens 6 can be considered as imparting a certain amount of phase shift to wave energy flowing between contour 6' and the circular contour of this lens. If $n$ is the same for all wave guides comprising lens 6, the amount of phase shift is determined by the thickness $t$ of lens 6, i. e., the lengths of the various waveguides. Thus, Equation 1 specifies the length of waveguide required to impart a certain amount of phase shift. However, if other means of imparting the required amount of phase shift can be used, the thickness $t$ may be set to any desired value and the proper phase relations obtained by the other means. Such means as changing the H-plane dimensions of the wave guides, filling the wave guides totally or partially with dielectric material, or inserting lossless reactive elements into the wave guides to form a loaded guide, can be used to make the phase shift of a given length of waveguide take on any desired value. If the index of refraction $n$ in Equation 1 be defined as the ratio of the amount of phase shift occurring between contour 6' and the circular entrance contour of lens 6 to the amount of phase shift that would occur for the same path length in air, $n$ can be controlled by the aforementioned means. Thus, $n$ in Equation 1 can be made to depend on the coordinate $y$. Equation 1 can then be satisfied for any prescribed value of $t$ by assigning the proper value to $n$.

Figure 3:
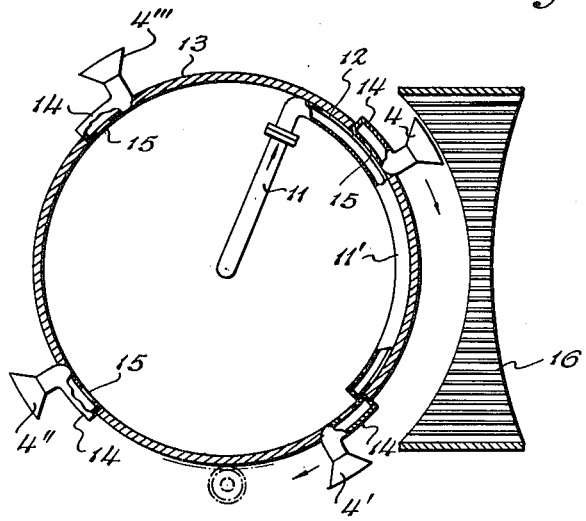
Fig. 3 is a structure similar to Fig. 2 but of somewhat improved design.
Figure 3:
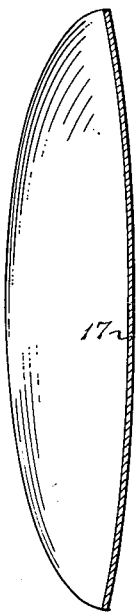

In the form of the invention shown in Fig. 3, energy is introduced into a fixed wave guide input 11, which has an arcuate portion 11' provided with a longitudinal slot 12 which serves as a commutator for a rotary joint, wherein the moving part of the joint comprises a circular rim-like member 13 carrying the horns, 4, 4', 4", and 4''', similar to the horns in Fig. 1. These horns are connected to short wave guide sections 14 provided with directional coupling apertures 15, which are adapted to align themselves with the slot 12 as these horns pass over the arcuate wave guide portion 11'. Suitable motive means, not shown, is employed for rotating the rim member 13 to cause the horns to move in succession past the entrance surface of lens 16 similar to lens 6, the entrance surface of this lens being circular and the exit surface having the contour substantially as given by Equation 1. Several spaces of this lens are energized at once by a horn, and the energy is constrained to flow parallel to the plates of the lens. The wave energy emerging from the lens has the same aperture as the rotating horn supplying the energy, and hence, has essentially the same radiation pattern. Owing to the special contours of the lens 16, the radiation pattern will be refracted in such manner that the maximum intensity of the radiation will always lie along a line passing through the center of the collimating device 17, shown as a reflector. Thus, the distribution of energy over the aperture remains substantially constant throughout the scanning cycle.

In the invention, as shown in Figs. 2 and 3, the electric field component is parallel to the plane of the figure. The refractive index of the intermediate lens 6 of Fig. 2 and 16 of Fig. 3 is determined only by the dimension perpendicular to the plane of the figures and preferably slightly less than one free space wavelength, so the plates of these lenses may be placed as close together as may be required to present a constant load impedance to the rotating horns. Tolerances on these lenses can be quite generous because only a portion of each lens equal to the horn aperture is used at any one time. Phase errors over such a small aperture have much less effect on the final beam than would be the case if they occurred over the full aperture which forms the final beam.

The commutating wave guide structure 11', 13, of Fig.

3, can be made of the type shown in application Serial No. 213,276, Kiyo Tomiyasu, filed February 28, 1951, wherein the outer ring member 13 to which the four rotating horns are attached forms the outer wall of the input wave guide. A choke joint is ordinarily used at the junction of the rotating ring 13 and the stationary wave guide. This combination of the stationary wave guide and the rotating horn structure provides in effect a commutating rotary joint connecting the fixed and rotating elements. Substantially 100 per cent of the energy introduced at the input, i. e., wave guide 11, is transferred through the coupler to the first horn positioned clockwise from the input. Just before the first horn, for example horn 4, reaches the end of the intermediate lens 16 remote from the input, the next horn 4''' begins to pick up energy. There is thus a smooth but rapid switchover from one horn to another without appreciable reflection of power back into the input line 11. This means the transmitter can be left on even during the switchover. Each of the four horns is energized only when it passes the intermediate lens 16 and the switchover time can be made a small percentage of a scan cycle. There are four complete scans per revolution of the horn structure so that it is very easy to obtain 30 or more scans per second.

Figure 4:
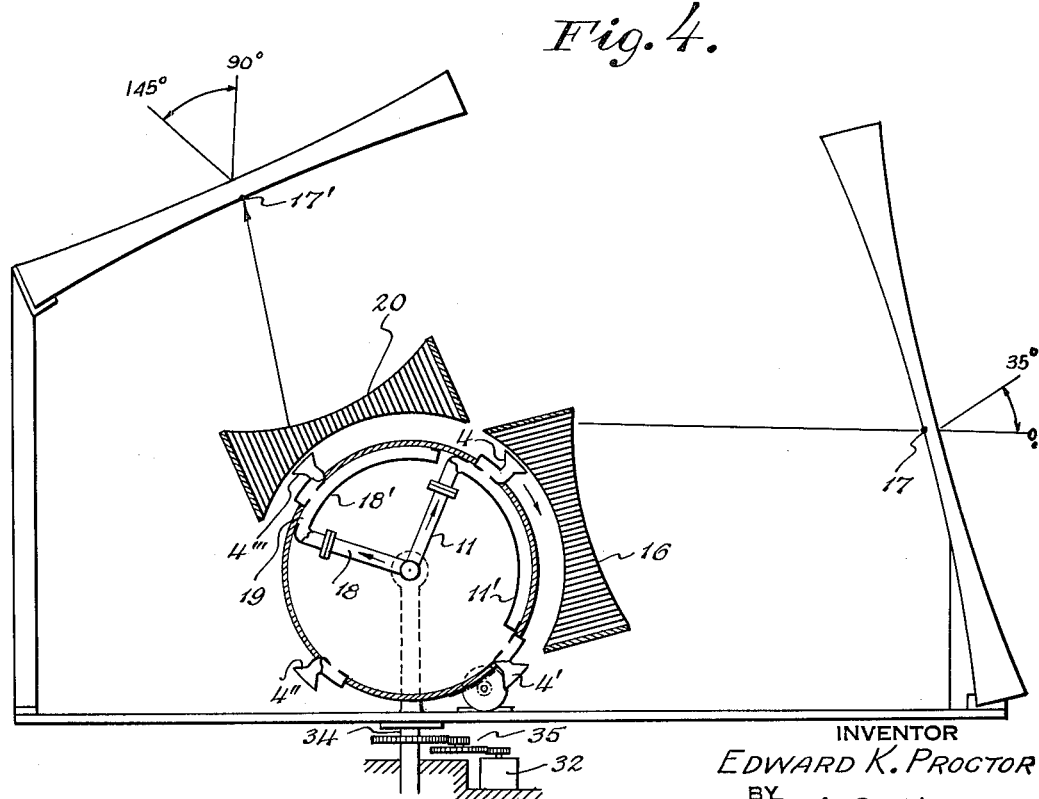
Fig. 4 is a somewhat modified structure employing two separate inputs, both of which employ the same set of horns.

The type of wave guide means and scanning feed shown in Fig. 3 can be used either separately or in combination with many types of radar, and this combination has features which recommend it highly for use where hemispherical coverage is desired. The form of the invention for securing hemispherical coverage is shown in Fig. 4, wherein two separate beams are employed, which together scan from the horizon to the zenith, i. e., from 0° to 90° in elevation. Since it is usually desirable to radiate more average power at the lower angles, the arrangement shown in Fig. 4 provides a 35° scanned angle for the lower beam and a 55° scanned angle for the upper beam. Both space sectors are scanned in the same interval of time, so the beam velocity of the lower beam is actually less than that of the upper beam. This division of the total 90° sector to be scanned is arbitrary and can be varied to fulfill the requirements of any particular system. The arrangement shown in Fig. 4 also preferably utilizes a narrower beam for the lower sector than for the upper sector, thus providing a more advantageous power distribution and results in lenses of different sizes. In this Fig. 4, the scanner of Fig. 3 has been modified to provide for two completely separate inputs, i. e., input wave guide 11 and input wave guide 18, both of which inputs utilize the same set of horns 4, 4', 4'' and 4'''.

As in Fig. 3, input wave guide 11 has an arcuate portion 11' to which the horns are successively coupled, as they rotate. Similarly wave guide 18 has an arcuate portion 18' provided with an arcuate slot 19, to which the horns are coupled in succession. In this structure, here again, the type of commutating coupler device shown in application Serial No. 213,276 may be employed. The operation of the scanner with respect to each of the inputs is exactly the same as described in connection with Fig. 3. In the arrangement of Fig. 4, there is a 180° azimuthal separation of the upper and lower beams. This would cause no difficulty in most instances, because separate indicators would normally be used for each of the two beams. Alternately a two-beam indicator tube could be used to display data on both beams. If it is desirable that the two beams have the same bearing, i. e., the upper beam constituting a continuation of the scanning zone of the lower beam, the components can be easily arranged to give this result. Thus, for example, the lenses 16 and 20 could be located side by side, the lens 20 being somewhat above lens 16, and a separate scanner like that of Fig. 3 provided for each, i. e., a separate set of commutating horns would be used to feed the lens 20 in such case. The arrangement shown in Fig. 4, however, has the advantage of lighter weight and simple construction. To complete the hemispherical scan the apparatus shown in Fig. 4 is rotated by a motor 32 shown connected through gearing 35 to a table support 34 rotatable about an axis extending at right angles to the axis of rotation of the horns 4, 4', 4'', and 4'''. Where a full hemisphere scan is not desired, the motor 32 can be replaced by manual turning means so that different directions of scan can be obtained, and the same is true of the preceding figures.

Figure 5:
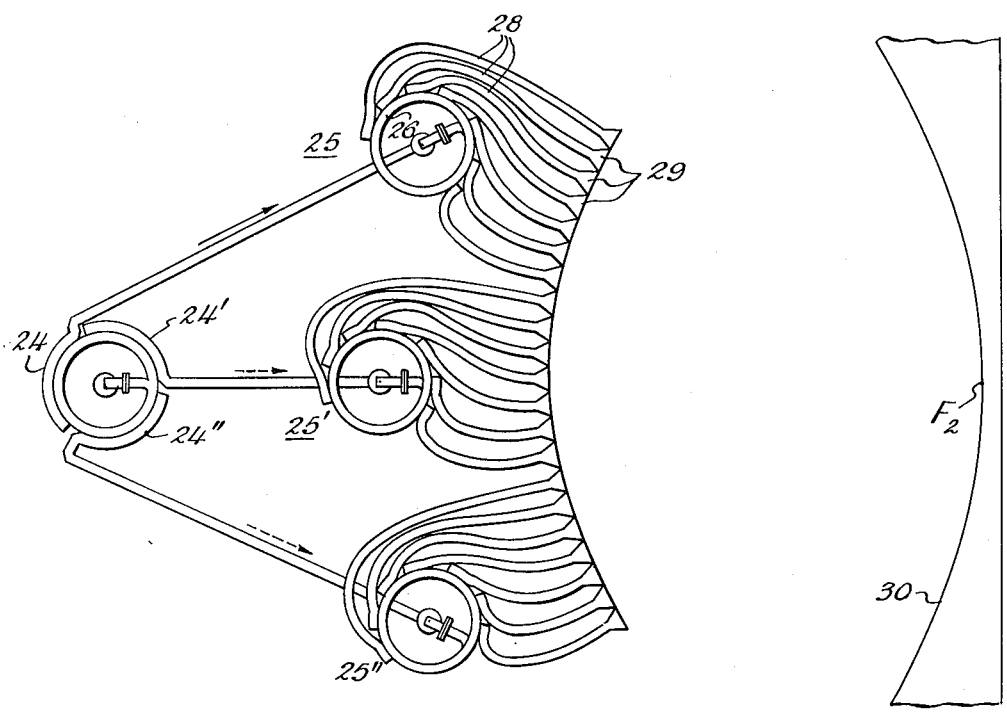
Fig. 5 shows another form of the invention employing the use of rotary couplers acting as switches for distributing the energy to a plurality of horns lying along the focal plane of the lens.
Figure 6:
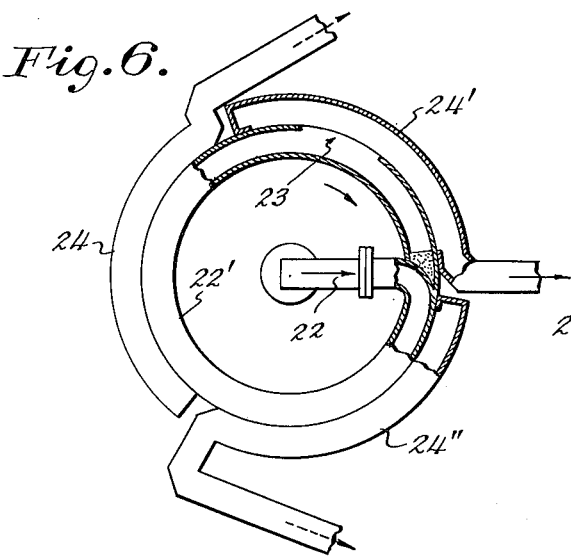
Fig. 6 is an enlarged fragmentary view of a portion of the structure of Fig. 5.
Figure 7:
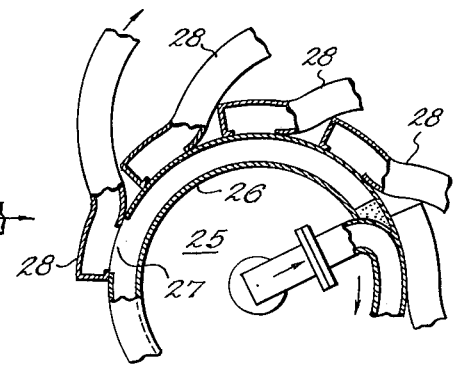
Fig. 7 is also an enlarged fragmentary view of a portion of the structure of Fig. 5.

In the form of the invention shown in Figs. 5, 6 and 7, a multiple rotary switch scanner is illustrated. The coupling device shown in detail in Fig. 6 comprises an input wave guide 22 feeding a substantially annular wave guide section 22', which is continuously rotated by motive means, not shown, and is provided in its outer periphery with a directional coupler slot 23 for successively feeding arcuate segmental wave guides 24, 24', and 24''. The rotating joint thus formed acts as a single pole multiple-throw wave guide switch or distributor. Energy introduced into the wave guide 22 is distributed in succession to segmental wave guides 24, 24' and 24'', which in turn supply this energy to other switch devices 25, 25' and 25''. As shown in Fig. 7, each of these switches comprises an inner annular wave guide section 26 having an outer directional coupling slot 27, which is successively coupled to a plurality of wave guides 28 distributed around the periphery of the annular wave guide section 26, which wave guides feed horns 29 disposed so as to direct energy toward a common point $F_2$, at which point there is positioned a collimating lens 30.

In operation, the rotating segmental wave guide section 22' distributes energy in succession to each of the switches 25, 25' and 25'' and each of these switches, in its turn, supplies energy through guides 28 progressively to the horns 29, so that a continuous scanning action is provided, energy from these horns being directed towards the lens 30 and collimated thereby for scanning a desired sector of space. As many horns 29 as desired may be used with their mouths distributed along the focal curve of the lens 30. By changing the relative speeds of the switches 25, 25' and 25'' and the number of horns 29, virtually any desired type of non-linear or linear scan can be produced. If desired, the several switches 25, 25' and 25'' can be stacked on a common axis rather than arranged separately, as shown in Fig. 5.

Since many changes could be made in the above construction of scanning antennae and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A rapid scanning radar antenna comprising a lens member having a circular input contour and an approximately elliptical output contour, means for sweeping the input contour of the lens member with electromagnetic energy, the output contour of said member forming said energy into a scanning beam, said scanning beam of energy being directed toward a common point, and a collimating device positioned adjacent said common point for receiving said scanning beam of energy and for radiating said scanning beam of energy into space.

2. A scanning antenna system comprising a microwave converging lens structure, said lens having an input and an output surface, at least one of said surfaces being a concave surface, means irradiating said lens with microwave energy sweeping over said input surface, said irradiating means including a plurality of wave guide conduits mounted for rotation about an axis situated at a fixed distance from the input surface of said lens, said wave guide conduits extending radially outward from said axis, means coupled to said wave guide conduits for successively energizing said conduits with microwave energy as said conduits are rotated about said axis, said microwave converging lens forming said microwave energy into a scanning beam of energy emerging from the output surface of said lens, the directive axis of said scanning beam being directed toward a point located in front of said lens, and a collimating device situated in the vicinity of said point, said collimating device collecting the scanning beam of energy emerging from said converging lens structure and radiating a beam of microwave energy into space.

3. The scanning antenna system as defined in claim 2 wherein said means coupled to said wave guide conduits for successively energizing said conduits with microwave energy comprises a commutating directional coupler having an inner arcuate wave guide feed member and a plurality of outer arcuate wave guide members, said outer arcuate wave guide members being relatively rotatable with respect to said inner arcuate wave guide feed member for successively coupling microwave energy to said rotatable outer wave guide members.

4. The scanning antenna system as defined in claim 3 wherein said irradiating means including a plurality of wave guide conduits mounted for rotation about an axis includes said outer arcuate wave guide members, and a wave guide horn coupled to each of said outer arcuate wave guide members.

5. A rapid scanning radar antenna comprising a microwave lens structure having a concave circular input surface and a concave output surface, means for sweeping the concave circular input surface of said lens structure with microwave energy, said sweeping means including a plurality of rotating wave guide sections extending radially outward from an axis, means for successively energizing said wave guide sections with microwave energy as they are rotated about said axis, said microwave lens structure forming said microwave energy into a scanning beam of energy emerging from the concave output surface of said lens, the longitudinal axis of said scanning beam being directed toward a point located in front of said lens, and a collimating device situated in the vicinity of said point, said collimating device collecting the scanning beam of energy emerging from said lens structure and radiating a beam of microwave energy into space.

6. A rapid scanning antenna system comprising a first microwave lens structure having a concave circular input surface and a concave output surface, means irradiating the circular input surface of said first lens with microwave energy sweeping evenly over said circular input surface, said irradiating means including a plurality of feed horns mounted for rotation about an axis coincident with the axis of the circular concave input surface, said feed horns extending radially outward from said axis, switching means coupled to said feed horns for successively energizing said feed horns with microwave energy as said feed horns are rotated about said axis, said irradiating means and said first lens providing a beam of microwave energy emerging from the concave output surface of said first lens and sweeping in an arc about a fixed point located in front of said lens, the directive axis of said beam passing through said fixed point as said beam is sweeping in its arcuate path, and a second lens structure situated in the vicinity of said fixed point, said second lens structure collecting the beam of energy emerging from the concave output surface of said first lens structure and radiating a scanning beam of microwave energy.

7. A scanning antenna system comprising a first microwave lens structure formed of horizontal parallel conductive plates spaced apart in the vertical plane, said lens structure having a concave input surface in the vertical plane formed as a sector of a circle and a concave output surface, means irradiating the concave input surface of said first lens with microwave energy sweeping in the vertical plane over the input surface, said irradiating means including a plurality of wave guide sections extending radially outward from a central horizontal axis, said horizontal axis coinciding with the center of the circle whose sector forms the concave input surface of said first lens, said wave guide sections being adapted for rotation about said central axis, a wave guide commutating switch means coupled to said wave guide sections for successively energizing said wave guide sections with microwave energy as said wave guide sections are rotated about said horizontal axis, said irradiating means and said first lens providing a beam of microwave energy emerging from the concave output surface of said first lens and sweeping smoothly in a vertical arc about a fixed point located in front of said lens, the longitudinal axis of said beam passing through said fixed point as said beam is sweeping in the vertical plane, and a second microwave lens structure situated in front of said first lens structure in the vicinity of said fixed point, said second lens being irradiated by said sweeping beam of microwave energy emerging from the concave output surface of said first lens structure.

8. A scanning antenna system comprising first and second microwave converging lens structures, each of said lenses having an input and an output surface, at least one of the surfaces of each of said first and second lenses being a concave surface, means irradiating said first and second lenses with microwave energy sweeping over their input surfaces, said irradiating means including a plurality of wave guide conduits mounted for rotation about an axis situated at a fixed distance from each of the input surfaces of said first and second lenses, said wave guide conduits extending radially outward from said axis, means coupled to said wave guide conduits for successively energizing said conduits with microwave energy as said conduits are rotated about said axis, said first and second microwave converging lenses being relatively angularly disposed about said axis, said first microwave converging lens forming a first scanning beam of energy emerging from its output surface, the directive axis of said first scanning beam being directed toward a first point located in front of said first lens, a first collimating device situated in the vicinity of said first point, said first collimating device collecting the scanning beam of energy emerging from said first converging lens and radiating a scanning beam of energy to effect sector scanning of space, said second microwave converging lens forming a second scanning beam of energy emerging from its output surface, the directive axis of said second scanning beam being directed toward a second point located in front of said second lens, said second point being different from said first point, and a second collimating device situated in the vicinity of said second point, said second collimating device collecting the scanning beam of energy emerging from said second converging lens and radiating a scanning beam of energy to effect sector scanning of space, the sector of space scanned by said first collimating device being substantially different from the sector of space scanned by said second collimating device.

References Cited in the file of this patent

UNITED STATES PATENTS

| Number | Name | Date |
|---|---|---|
| 2,436,380 | Cutler | Feb. 24, 1948 |
| 2,442,951 | Iams | June 8, 1948 |
| 2,527,222 | Iams | Oct. 24, 1950 |
| 2,563,990 | Cutler | Aug. 14, 1951 |
| 2,595,186 | Breetz | Apr. 29, 1952 |